US008713092B2

(12) United States Patent
Kumbalimutt et al.

(10) Patent No.: US 8,713,092 B2
(45) Date of Patent: *Apr. 29, 2014

(54) METHOD AND SYSTEM FOR DISTRIBUTING LOAD BY REDIRECTING TRAFFIC

(75) Inventors: Vishwajith Kumbalimutt, Redmond, WA (US); David J. Simons, Redmond, WA (US); Robert I. Brown, Kirkland, WA (US); Elena Apreutesei, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/368,969

(22) Filed: Feb. 10, 2009

(65) Prior Publication Data

US 2009/0282149 A1 Nov. 12, 2009

Related U.S. Application Data

(63) Continuation of application No. 10/606,999, filed on Jun. 26, 2003, now Pat. No. 7,543,061.

(51) Int. Cl.
*G06F 15/16* (2006.01)
*G06F 15/173* (2006.01)

(52) U.S. Cl.
USPC ............................ 709/203; 709/226; 709/228

(58) Field of Classification Search
USPC .......................................................... 709/203
See application file for complete search history.

(56) References Cited

U.S. PATENT DOCUMENTS

| 5,371,852 | A | 12/1994 | Attanasio et al. |
| 5,809,239 | A | 9/1998 | Dan et al. |
| 5,867,706 | A | 2/1999 | Martin et al. |
| 6,460,082 | B1 | 10/2002 | Lumelsky et al. |
| 6,463,454 | B1 | 10/2002 | Lumelsky et al. |
| 6,466,980 | B1 | 10/2002 | Lumelsky et al. |
| 6,516,350 | B1 | 2/2003 | Lumelsky et al. |
| 6,529,950 | B1 | 3/2003 | Lumelsky et al. |
| 6,822,957 | B1 | 11/2004 | Schuster et al. |
| 6,992,974 | B1 | 1/2006 | Tripathi |
| 7,069,331 | B2 | 6/2006 | Tripathi et al. |
| 7,072,341 | B2 | 7/2006 | Xu et al. |
| 7,085,829 | B2 | 8/2006 | Wu et al. |
| 7,110,393 | B1 | 9/2006 | Tripathi et al. |
| 7,123,700 | B1 | 10/2006 | Weaver, III et al. |
| 7,543,061 | B2 | 6/2009 | Kumbalimutt et al. |

(Continued)

*Primary Examiner* — John Follansbee
*Assistant Examiner* — Alan S Chou
(74) *Attorney, Agent, or Firm* — Sonia Cooper; Jim Ross; Micky Minhas

(57) ABSTRACT

Disclosed is a system for servers to redirect client requests to other servers in order to distribute client traffic among the servers. A client is assigned to a server although the client may be unaware of that assignment. When the client accesses a server, a server possibly identified to the client by a name service, the server checks the client's assignment. If the client is not assigned to this server, then in some scenarios this server redirects the client to its assigned server. The client responds by sending its request to the assigned server. In other scenarios, the first server accessed by the client proxies the client's traffic to the assigned server. A database is kept of client-to-server assignments. If the present load distribution is less than ideal (e.g., clients are assigned to an unavailable server), then the assignment database is updated to reflect how the load should be distributed.

14 Claims, 20 Drawing Sheets

(56) References Cited

U.S. PATENT DOCUMENTS

| | | |
|---|---|---|
| 2003/0005280 A1 | 1/2003 | Bobde et al. |
| 2003/0126183 A1* | 7/2003 | Wu et al. ................ 709/105 |
| 2004/0009761 A1 | 1/2004 | Money et al. |
| 2004/0024879 A1* | 2/2004 | Dingman et al. ............ 709/227 |
| 2004/0199649 A1 | 10/2004 | Tarnanen et al. |
| 2006/0120362 A1* | 6/2006 | Westman et al. ............ 370/389 |
| 2010/0091765 A1* | 4/2010 | Doshi et al. ................ 370/352 |

* cited by examiner

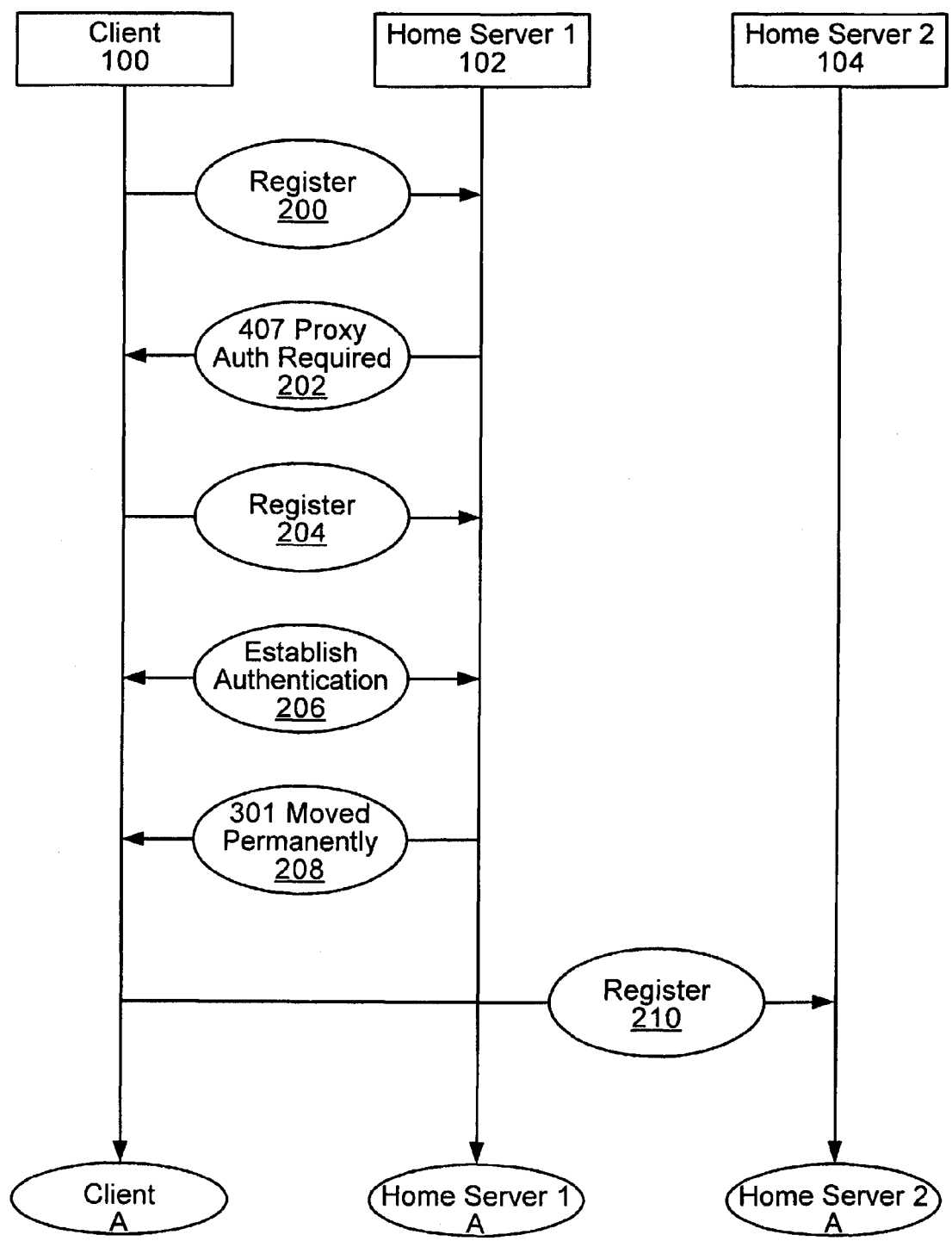

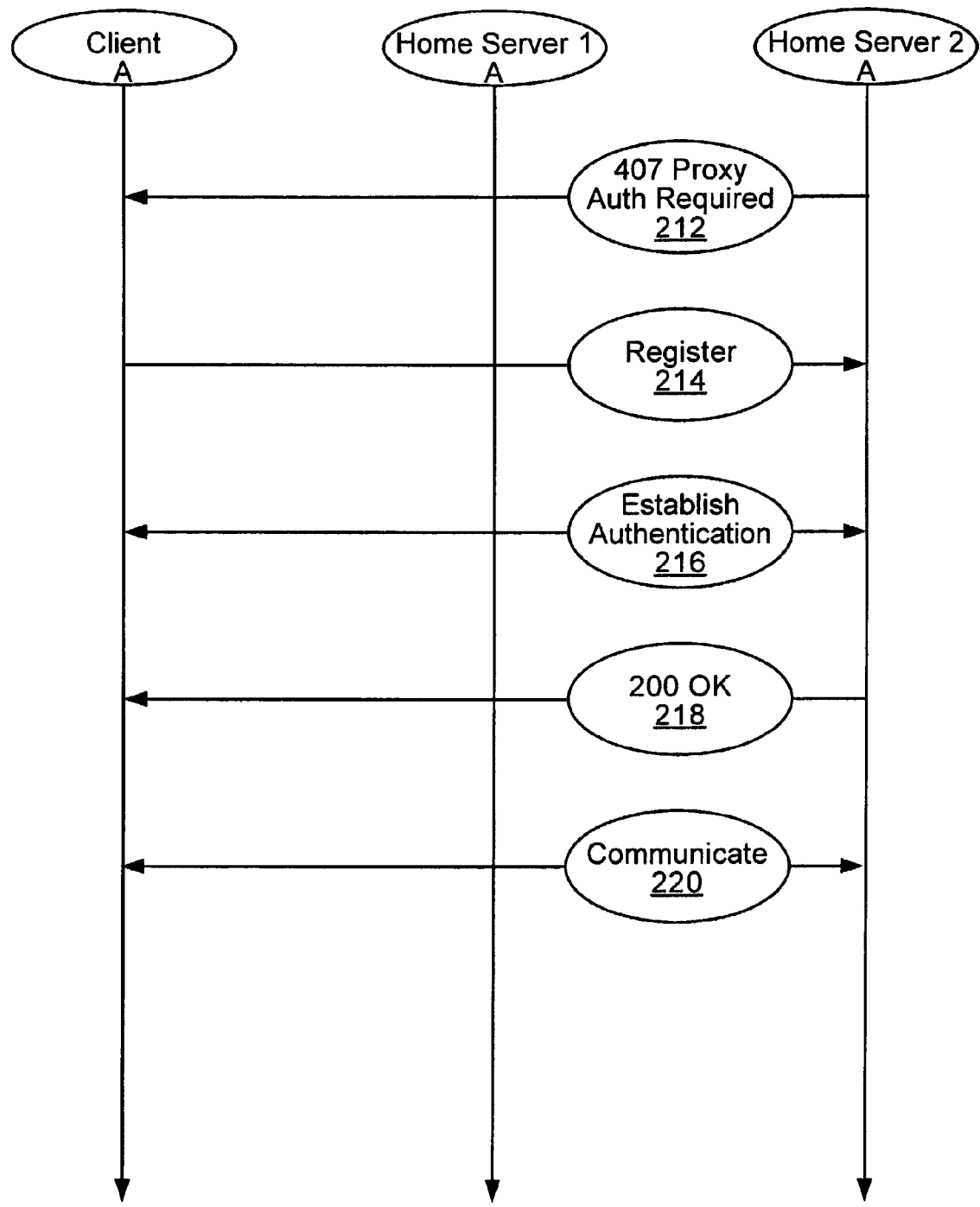

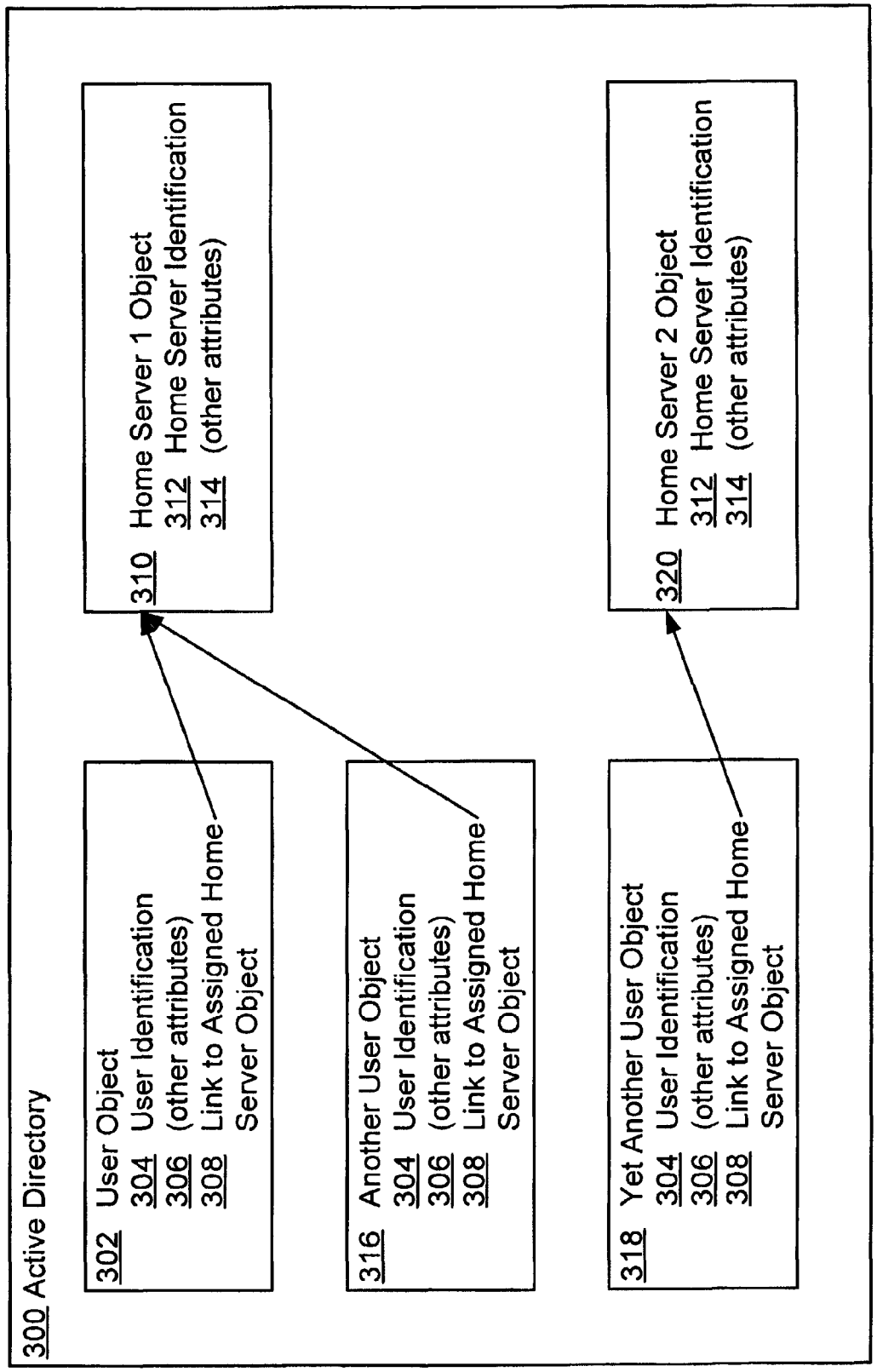

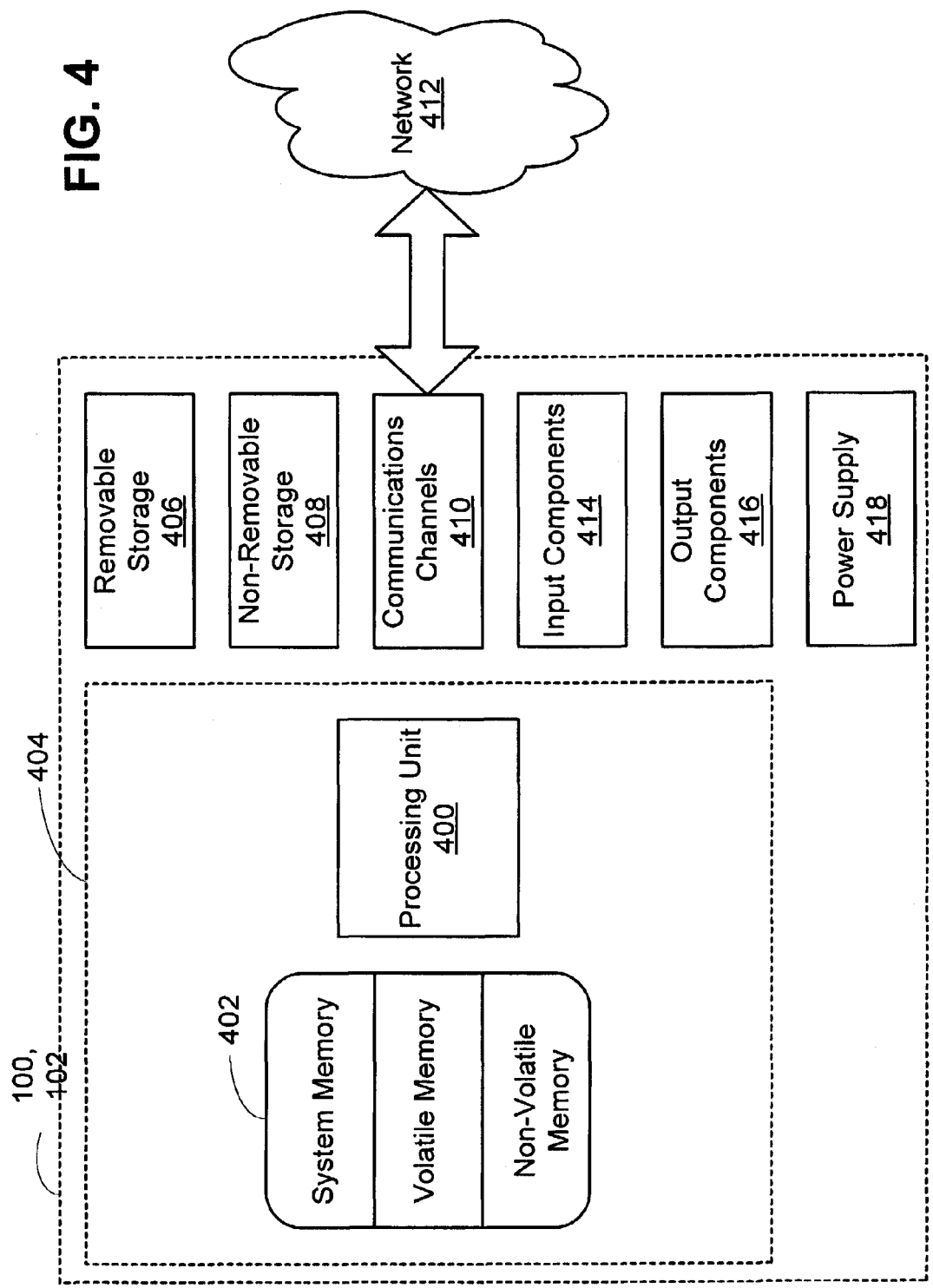

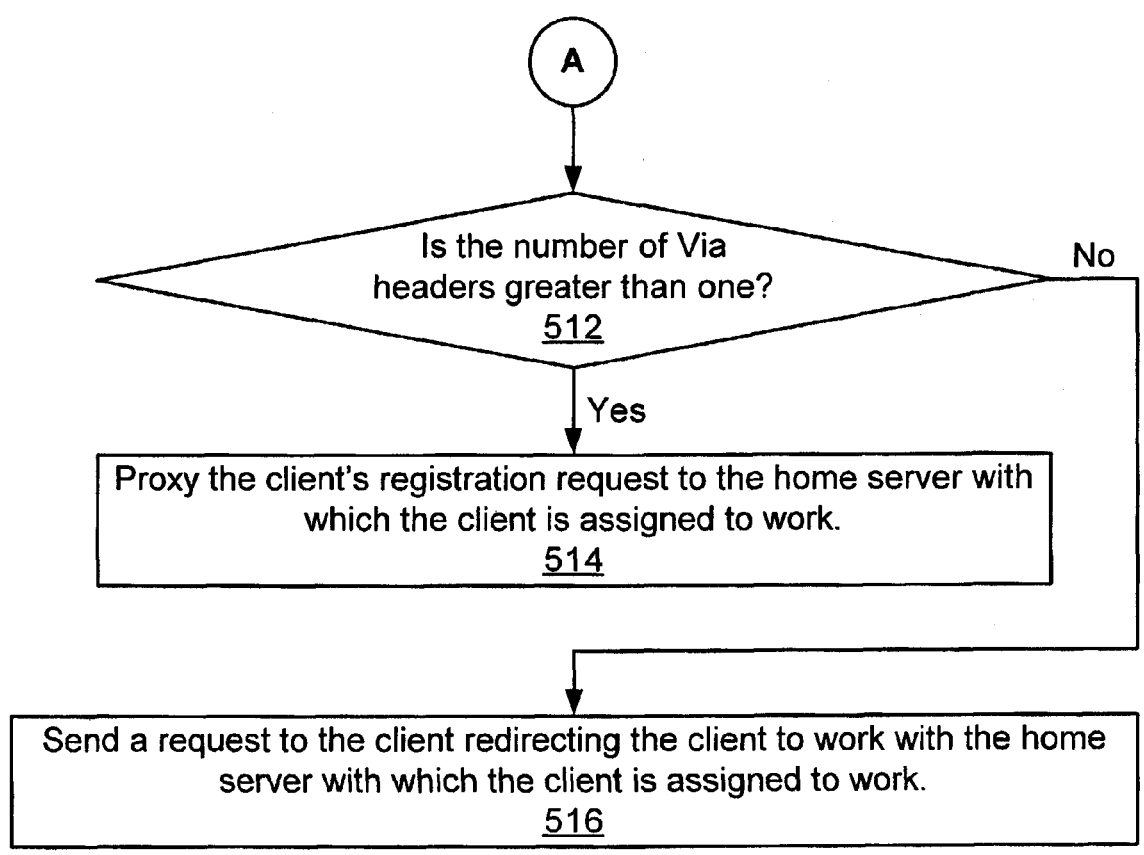

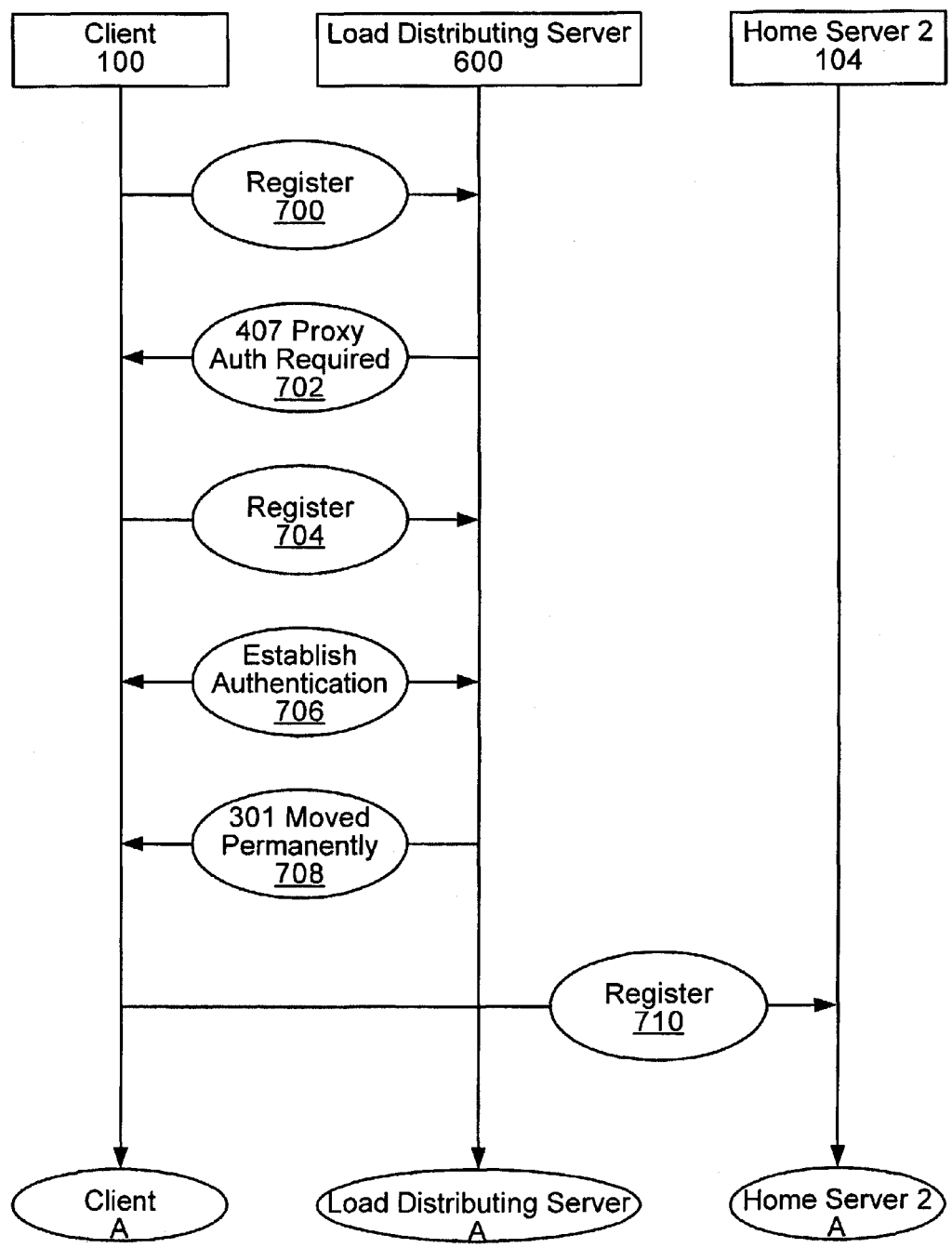

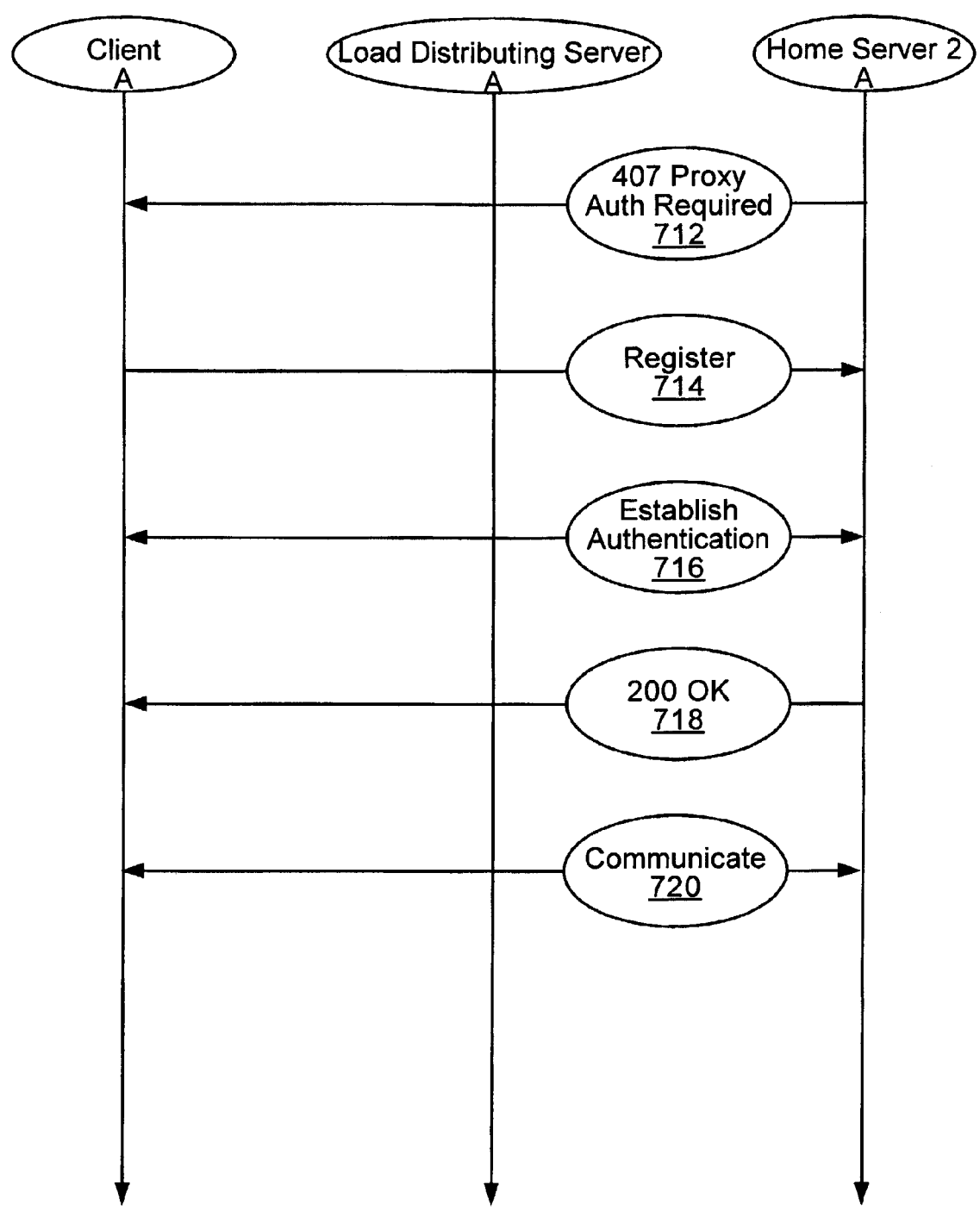

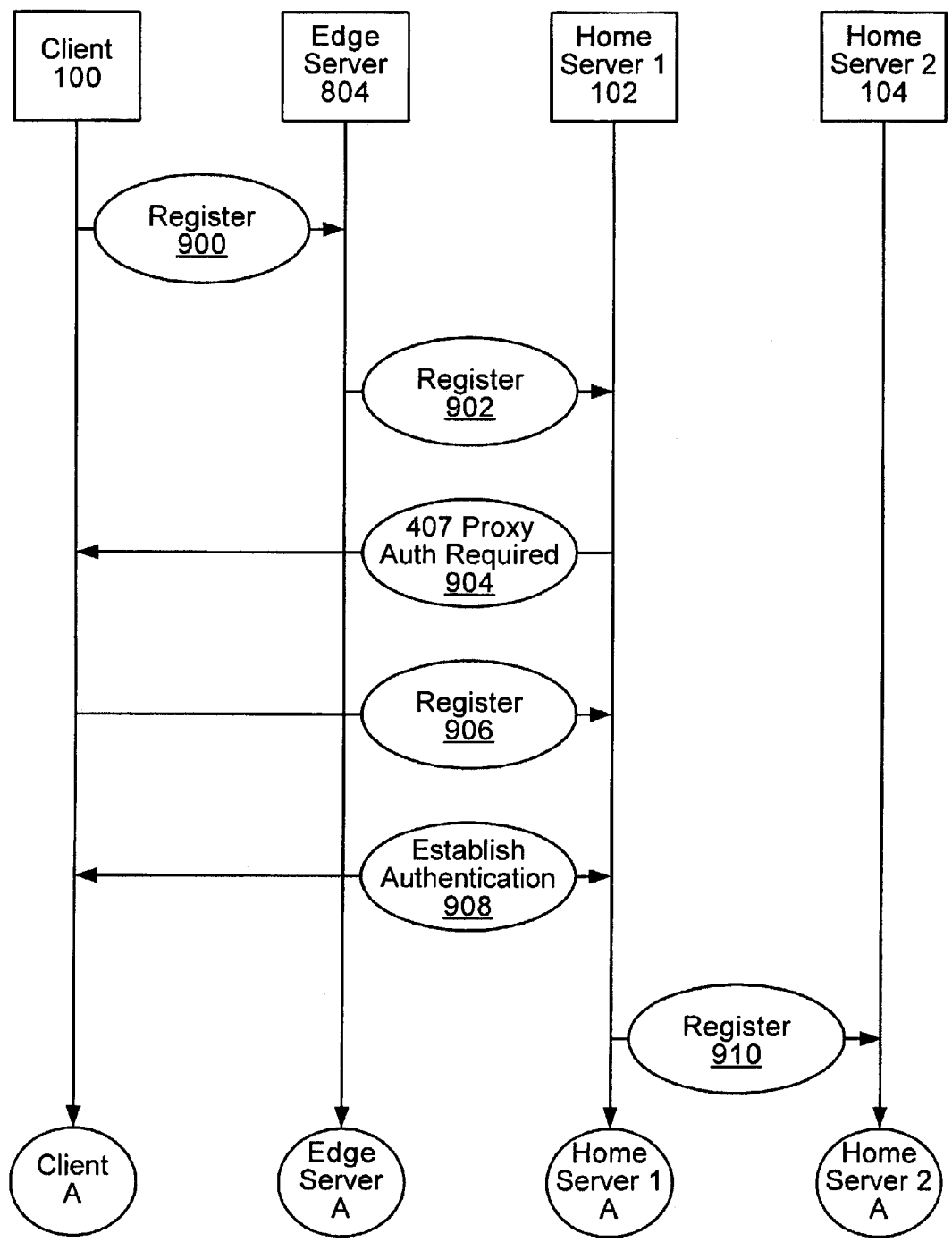

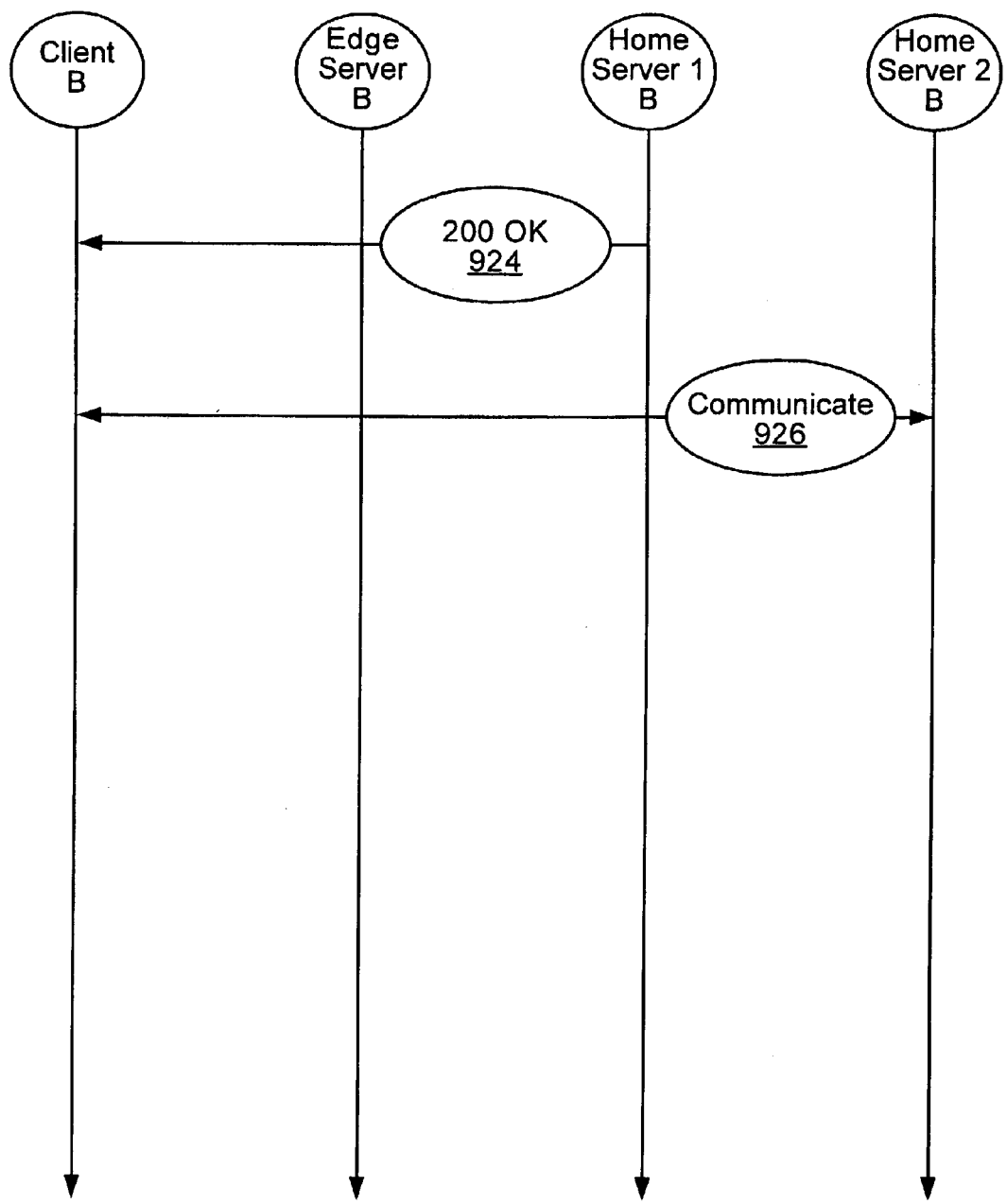

METHOD AND SYSTEM FOR DISTRIBUTING LOAD BY REDIRECTING TRAFFIC

CROSS REFERENCE TO RELATED APPLICATION

The present application is a Continuation of U.S. patent application Ser. No. 10/606,999, filed Jun. 26, 2003, and entitled "METHOD AND SYSTEM FOR DISTRIBUTING LOAD BY REDIRECTING TRAFFIC," now U.S. Pat. No. 7,543,061 issued on Jun. 2, 2009, which is incorporated herein in its entirety by reference.

TECHNICAL FIELD

The present invention is related generally to computer communications and, more particularly, to distributing load among server computers.

BACKGROUND OF THE INVENTION

One of the most prevalent aspects of today's technological environment is the spread of computer communications and, with it, the proliferation of distributed computing. Only rarely are new applications developed that depend solely upon their host computer. Much more often, applications are given the ability to reach out over communications networks to seek assistance from, or to take advantage of services provided by, other computers.

Capitalizing on the benefits offered by computer communications, specialized computers, called "servers," exist primarily to provide computing services to other computers, called their "clients." In client/server computing, clients request services from servers. While some services are provided to any client that requests them, other services require that a client authenticate its identity and its permission to use the service.

A server is built with the capacity to accommodate a certain number of simultaneous clients. To accommodate even more clients, and to increase the availability of services in the event that one server becomes unavailable, multiple servers are often configured to provide a common set of services.

With multiple servers providing the same services, the need arises for a mechanism to direct a given client to a particular server. It is administratively impractical for a client to be configured with all of the information it needs to choose an appropriate server. Instead, a client in search of a service provider queries a well known "name service." Like the telephone yellow pages, the name service directs the client to a server that can provide the service requested by the client. Some name services direct an incoming client request to a server randomly selected from the set of servers that provide the requested service. Other name services select servers in a more deterministic, for example in a round robin, fashion.

These server selection mechanisms, while working well for some services, can prove to be inadequate for popular real-time communications (RTC) services. RTC services, such as audio or video delivery and telephony, usually involve the delivery of large amounts of bandwidth for extended periods of time. An RTC server (often called a "home server") overloaded with too many clients can fail to deliver the requested bandwidth or can fail to meet delivery timing requirements: A packet of music arriving too late to be played in its proper place is less than worthless. Existing server selection mechanisms tend to overload some home servers while leaving others underutilized. In addition to not intelligently distributing load among the home servers, existing mechanisms, in the face of the failure of one home server, involve lengthy disruptions until the failed home server's clients are "rehomed" onto other servers.

SUMMARY OF THE INVENTION

In view of the foregoing, the present invention provides a system for servers to redirect incoming client requests to other servers in order to distribute client traffic among the servers. A client is assigned to a server although the client may be unaware of that assignment. When the client accesses a server, a server possibly identified to the client by a name service, the server checks the client's assignment. If the client is assigned to this server, then this server accepts the client and begins to fulfill the client's service request. If, on the other hand, the client is assigned to another server, then in some scenarios this server redirects the client to its assigned server. The redirection is accomplished using existing protocol mechanisms by telling the client that the assigned server is now that client's outbound proxy. The client responds by sending its request to the assigned server. From then on, the client uses its assigned server for all outbound service requests.

In other scenarios, it is not practical or ideal to redirect the client to its assigned server. For example, the client's request may have already been redirected to the accessed server making further redirection less than ideal. In these scenarios, the first server accessed by the client proxies the client's traffic to the assigned server.

Existing protocols need not change to accommodate the present invention because the messages used to redirect or proxy the clients are already designed into session initiation protocols, albeit intended for other purposes.

A server can be configured purely to redistribute load. No clients are assigned to this load distributing server, instead this server redirects or proxies all incoming client requests.

A database is kept of client-to-server assignments. Because clients need not be aware of their server assignments, this database can be centralized for easy maintenance. If the present distribution of load is less than ideal (e.g., some clients are assigned to a server that has just become unavailable), then the assignment database is updated to reflect how the load should be distributed.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 2a and 2b together form a dataflow diagram illustrating how an embodiment of the present invention could work in the communications environment of FIG. 1;

FIG. 3 is data structure diagram of a table usable by a server in redirecting traffic;

FIG. 4 is a schematic diagram generally illustrating an exemplary computer system that supports the present invention;

FIGS. 5a and 5b together form a flowchart showing an exemplary method according to the present invention for distributing load by redirecting traffic;

FIGS. 7a and 7b together form a dataflow diagram illustrating how an embodiment of the present invention could work in the communications environment of FIG. 6;

FIGS. 9a, 9b, and 9c together form a dataflow diagram illustrating how an embodiment of the present invention could work in the communications environment of FIG. 8;

DETAILED DESCRIPTION OF THE INVENTION

Figure 1:
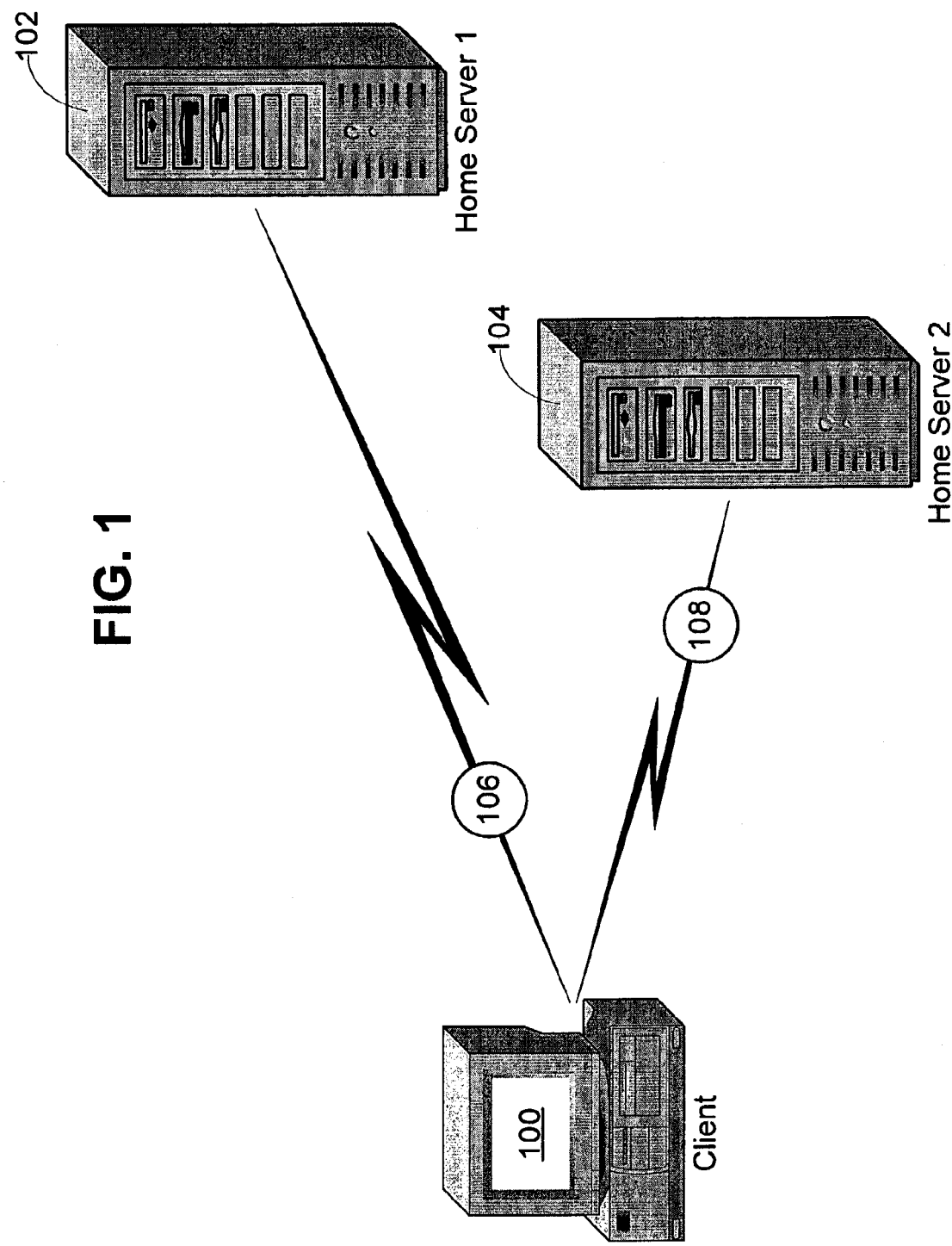
FIG. 1 is a block diagram of a communications environment with a client and two home servers.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention provides a system for distributing traffic load among servers. Load is distributed from a first server to a second server when the first server either redirects an incoming client request to the second server or proxies the client's traffic to the second server. Some basic concepts of the invention are illustrated with reference to FIGS. 1 and 2, while later figures illustrate refinements.

In FIG. 1, a user of a client computer 100 wishes to use RTC services. A corporation called "NetworkCo" has set up two RTC home servers 102 and 104. While the present invention is particularly useful when the requested services are RTC services, nothing in this description should be taken as restricting the applicability of the invention to RTC services. Similarly, the designation of the servers 102 and 104 of FIG. 1 as "home servers" is useful for the present discussion, but is not meant to be limiting in any way.

The client 100 sends a service request to the home server 102 via communications flow 106. Throughout this description, communications flows are illustrated as elongated "Z"s to emphasize that details of the communications are omitted. These details vary depending upon the protocols and the communications hardware used. The details are omitted from the present discussion because they do not directly impact the methods of the present invention and because they are well known to those of skill in the art of computer communications.

The client 100 may have randomly chosen the home server 102 to be the recipient of its request, or the home server 102 may have been identified to the client 100 by a name service. In any case, the service request is received by the home server 102. After authenticating the client 100 if necessary, the home server 102 queries a database to determine to which home server the user of the client 100 is assigned. If the user is assigned to the home server 102, then the home server 102 accepts the request and begins to provide the requested service.

If, on the other hand, the database reveals that the user of the client 100 is assigned to the home server 104, then the home server 102, in response to the client 100's service request, tells the client 100 that it should now use the home server 104 as its outbound proxy server. The client 100 agrees to this and resends its request to the home server 104. The home server 104 can be completely unaware of the conversation just completed between the client 100 and the home server 102. When it receives the service request from the client 100, the home server 104 can run through the same procedure that the home server 102 just used. In this case, the client-to-home-server database reveals to the home server 104 that it is the server assigned to the user of the client 100. The home server 104 accepts the client 100's request and begins to provide the requested service.

The redirection scenario of FIG. 1 is described above in very broad terms. While the intended scope of the present invention is at least as broad, it may help the reader to walk through the same scenario, this time with details from a specific embodiment of the present invention and incorporating messaging from currently popular protocols. The dataflow diagram of FIGS. 2a and 2b and the accompanying text provide those details.

In the dataflow diagram of FIGS. 2a and 2b, and in the other dataflow diagrams discussed below, time flows from top to bottom and from one page to the next. Before the dataflow diagram begins in step 200, the client 100 of FIG. 1 issues a DNS SRV (Domain Name System for Services) request for an RTC server. The response to that request identifies the home server 102. In step 200 of FIG. 2a, the client 100 establishes a TLS (Transport Layer Security) connection with the home server 102 and sends a REGISTER request. Calling the user of the client 100 "user," the client 100 "client," and the client's domain "network.com," the REGISTER message looks like this:

---

REGISTER sip:HomeServer102.network.com SIP/2.0

Via: SIP/2.0/TLS client.network.com; branch = z9hG4bkc
From: User <sip:user@network.com>; tag = 1123; epid; 3344
To: User <sip:user@network.com>;
Call-ID: 123@client.network.com
CSeq: 1 REGISTER

| REGISTER sip:HomeServer102.network.com SIP/2.0 | |
|---|---|
| Max-Forwards: | 70 |
| Contact: | <sip:user@network.com> |
| Content-Length: | 0 |

The home server 102 begins proxy authentication in step 202 by challenging the client 100. The 407 Proxy Authentication Required message sent by the home server 102 indicates that the home server 102 supports NT LAN Manager authentication:

| SIP/2.0 407 Proxy Authentication Required | |
|---|---|
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 123@client.network.com |
| CSeq: | 1 REGISTER |
| Proxy-Authenticate: | NTLM realm = "NetworkCo", target name = "HomeServer102.network.com", qop = "auth" |
| Content-Length: | 0 |

In step 204, the client 100 responds by sending a new REGISTER request with the user's authentication credentials:

| REGISTER sip:HomeServer102.network.com SIP/2.0 | |
|---|---|
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 123@client.network.com |
| CSeq: | 2 REGISTER |
| Max-Forwards: | 70 |
| Proxy-Authorization: | NTLM realm = "NetworkCo", target name = "HomeServer102.network.com", qop = "auth", gssapi-data = "34fcdf9345345", opaque = "ACDC123" |
| Contact: | "User" <sip:user@network.com> |
| Content-Length: | 0 |

In step 206, the home server 102 checks the client 100's authentication credentials. (Note that as the details of authentication are well known in the art, step 206 omits these details and omits some underlying steps.) If the credentials are valid, then the home server 102 queries a database for the home server to which the user of the client 100 is assigned.

The client-to-home-server database can reside on the home server 102 itself or can be accessed over a network. FIG. 3 illustrates one possible database format: a Microsoft "ACTIVE DIRECTORY" 300. In some embodiments, one Active Directory, possibly replicated for increased reliability, is set up for each service. In other embodiments a single Active Directory can encompass several services. In the Active Directory 300 of FIG. 3, one User Object 302 corresponds to each user. The User Object 302 identifies the user (field 304), provides other information (field 306), and points to an Assigned Home Server Object (field 308). In the present scenario, the User Object 318 corresponds to the current user of the client 100. The User Object 318 points to the Assigned Home Server Object 320. That object tells the querying home server 102 that the user is assigned to work with the home server 104.

Because the present home server 102 is not the server assigned to work with the user of the client 100, the home server 102 either redirects the client 100's request to the home server 104 or proxies the user's traffic to that home server. (How the home server 102 chooses between these possibilities is discussed below in relation to other exemplary scenarios.) In the present scenario, the home server 102 redirects the client 100 by sending, in step 208, a signed 301 Moved Permanently message:

| SIP/2.0 301 Moved Permanently | |
|---|---|
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 123@client.network.com |
| CSeq: | 2 REGISTER |
| Proxy-Authenticate: | NTLM realm = "NetworkCo", target name = "HomeServer102.network.com", qop = "auth", rspauth = "gdj223", opaque = "GGF122", srand = 8733, snum = 1 |
| Contact: | sip:HomeServer104.network.com |
| Content-Length: | 0 |

When the client 100 receives the 301 message, it checks the signature for authenticity. If the message is authentic, then the client 100 accepts the information in the Contact field of the 301 message redirecting the client 100 to the home server 104. From this point until the client 100 is shut down (in normal circumstances), the client 100 attempts to use the home server 104 as its outbound proxy server. It begins to do so in step 210 by sending a REGISTER request to the home server 104:

| REGISTER sip:HomeServer104.network.com SIP/2.0 | |
|---|---|
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 124@client.network.com |
| CSeq: | 3 REGISTER |
| Max-Forwards: | 70 |
| Contact: | <sip:user@network.com> |
| Content-Length: | 0 |

Upon receiving this message, the home server 104 uses the same method earlier used by the home server 102. In step 212 of FIG. 2b, mimicking step 202 of FIG. 2a, the home server 104 begins to authenticate the client 100:

| SIP/2.0 407 Proxy Authentication Required | |
|---|---|
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 124@client.network.com |
| CSeq: | 3 REGISTER |
| Proxy-Authenticate: | NTLM realm = "NetworkCo", target name = "HomeServer104.network.com", qop = "auth" |
| Content-Length: | 0 |

The client 100 responds to the home server 104 in step 214 in a manner similar to its response to the home server 102 in step 204, again providing the user's authentication credentials:

| REGISTER sip:HomeServer104.network.com SIP/2.0 | |
| --- | --- |
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 124@client.network.com |
| CSeq: | 3 REGISTER |
| Max-Forwards: | 70 |
| Proxy-Authorization: | NTLM realm = "NetworkCo", target name = "HomeServer104.network.com", qop = "auth", gssapi-data = "34wwdf9345345", opaque = "ACD2223" |
| Contact: | "User" <sip:user@network.com> |
| Content-Length: | 0 |

The home server 104 authenticates the client 100 in step 216. Then the home server 104 queries the Active Directory 300 of FIG. 3 and discovers that the user of the client 100 is assigned to work with the home server 104. The home server 104 thus agrees to provide its services to that user. It indicates its readiness in step 218 by sending a signed 200 OK message:

| SIP/2.0 200 OK | |
| --- | --- |
| Via: | SIP/2.0/TLS client.network.com; branch = z9hG4bkc |
| From: | User <sip:user@network.com>; tag = 1123; epid; 3344 |
| To: | User <sip:user@network.com>; |
| Call-ID: | 124@client.network.com |
| CSeq: | 3 REGISTER |
| Expires: | 300 |
| Proxy-Authorization: | NTLM realm = "NetworkCo", target name = "HomeServer104.network.com", qop = "auth", gssapi-data = "34wwdf9345345", opaque = "ACD2223", rspauth = "fefeacdd", srand = 98984345, snum = 1 |
| Contact: | "User" <sip:user@network.com> |
| Content-Length: | 0 |

At this point, the user of the client 100 has been redirected to the appropriate home server. In step 220, the home server 104 begins to provide the requested services to that user.

When the methods illustrated above are applied, including the assignment of each user to a particular home server in the Active Directory 300 of FIG. 3, traffic loads are distributed in a controlled and predictable fashion. This aids in the task of administering the home servers so that they are neither overloaded nor underutilized.

Note that the detailed message sequences and formats of this example are meant merely to illustrate an embodiment of the invention in the context of actual protocols. They are not meant to limit other embodiments of the invention that use other protocols.

The home servers 102 and 104 of FIG. 1 may be of any architecture. FIG. 4 is a block diagram generally illustrating an exemplary computer system that supports the present invention. The computer system of FIG. 4 is only one example of a suitable environment and is not intended to suggest any limitation as to the scope of use or functionality of the invention. Neither should the computing device 102 be interpreted as having any dependency or requirement relating to any one or combination of components illustrated in FIG. 4. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 400 and memory 402. The memory 402 may be volatile (such as RAM), non-volatile (such as ROM or flash memory), or some combination of the two. This most basic configuration is illustrated in FIG. 4 by the dashed line 404. The computing device 102 may have additional features and functionality. For example, the computing device 102 may include additional storage (removable and non-removable) including, but not limited to, magnetic and optical disks and tape. Such additional storage is illustrated in FIG. 4 by removable storage 406 and non-removable storage 408. Computer-storage media include volatile and non-volatile, removable and non-removable, media implemented in any method or technology for storage of information such as computer-readable instructions, data structures, program modules, or other data. Memory 402, removable storage 406, and non-removable storage 408 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 102. Any such computer-storage media may be part of device 102. Device 102 may also contain communications channels 410 that allow the device to communicate with other devices. Communications channels 410 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 414 such as a keyboard, mouse, pen, voice-input device, tablet, touch-input device, etc. Output devices 416 such as a display (which may be integrated with a touch-input device), speakers, and printer may also be included. All these devices are well known in the art and need not be discussed at length here.

Figure 5A:
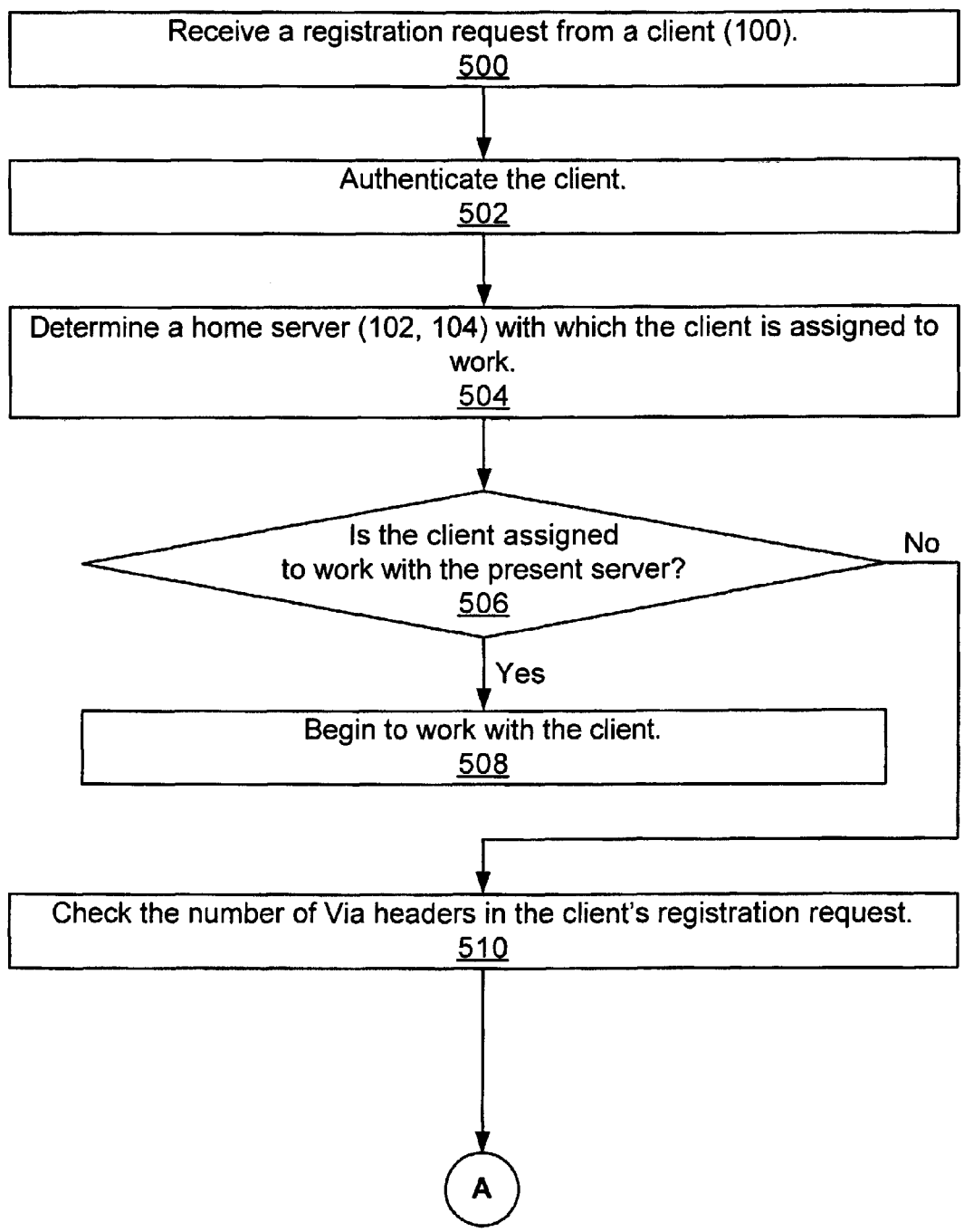

Having described one scenario in which embodiments of the present invention can be practiced, the discussion proceeds to the flowchart of FIGS. 5a and 5b. This flowchart, much of which should be familiar from the preceding discussion, illustrates an exemplary method practiced by a home server (or by a load distributing server: see the discussion accompanying FIG. 6 below) when distributing traffic. The flowchart includes options that are not present in all embodiments.

The method begins in step 500 when the home server receives a request for service from a client. The home server first authenticates the client in step 502. The above two steps correspond to messages 200 through 206 of the example discussed above. In step 504, the home server determines, possibly by consulting the Active Directory 300 of FIG. 3, with which home server the client is assigned to work. If in step 506 the home server discovers that the client is assigned to work with the present home server, then the home server begins to deliver the requested service in step 508. Steps 506 and 508 correspond to messages 218 and 220 of the above example.

If the client is not assigned to work with the present home server, then, in some embodiments, the home server in step 510 checks the number of Via headers in the client's registration request message. Each time the message is forwarded, a new Via header is added. Thus, checking the number of Via headers tells the home server whether it is the original recipient of the registration request. If this home server is the original recipient (only one Via header is found in step 512), then, as in the scenario of FIGS. 2a and 2b, the home server sends a message redirecting the client to work with the home server with which that client has been assigned (step 516).

If the number of Via headers is found to be greater than one in step 512, then it might be inefficient to further redirect the client's traffic. Examples of this case are illustrated in the scenarios below. Rather than redirecting, the home server in step 514 proxies the client's request on to the client's assigned home server. Proxying is in some ways less than ideal because the original home server remains in the communications flow between the client and its assigned home server and is thus a potential bottleneck. In redirection, on the other hand, once the original home server sends the redirect message (step 516 of FIG. 5b and message 208 of FIG. 2a), the original home server removes itself from all further participation in the communications between the client and its assigned home server.

Figure 6:
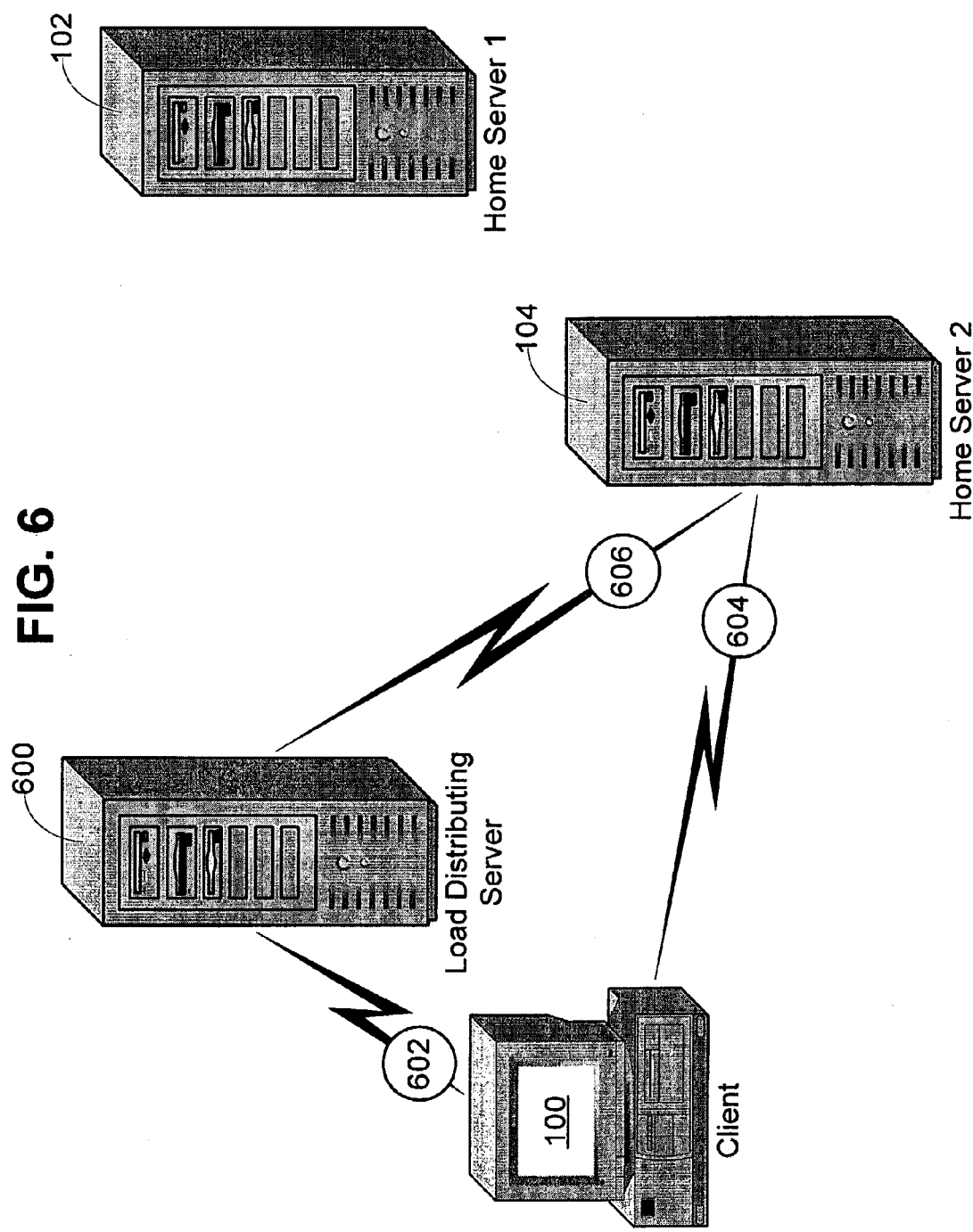
FIG. 6 is a block diagram of a communications environment with a dedicated load distributing server.

FIG. 6 presents a variation on the communications environment of FIG. 1: A load distributing server 600 is added. As it name indicates, the load distributing server 600 always redirects or proxies client traffic; it is not the assigned home server for any client. When the client 100 asks DNS SRV for a home server, it receives the name of the load distributing server 600 rather than the name of a possibly inappropriate home server. Two advantages of deploying the load distributing server 600 in this fashion are: (1) The home servers 102 and 104 need not perform load balancing and traffic distribution thus they can devote more of their resources to providing services and (2) If one of the home servers becomes unavailable, the DNS SRV records need not be updated; changing the client-to-home-server database 300 is sufficient.

The dataflow diagram of FIGS. 7a and 7b, which parallels the dataflow diagram of FIGS. 2a and 2b, illustrates how the client 100 communicates with the load distributing server 600: After authenticating the client 100 (in communications flow 602 of FIG. 6), the load distributing server 600 redirects (communications flow 604) (or proxies, communications flow 606) the client 100 to its assigned home server 104. For further details on this dataflow diagram and on an appropriate embodiment of its messaging, consult the discussion above accompanying FIGS. 1 through 3.

An exemplary embodiment of the load distributing server 600 implements the method of FIGS. 5a and 5b with the exception that, as the load distributing server 600 is never an assigned home server, steps 506 and 508 are omitted.

Figure 8:
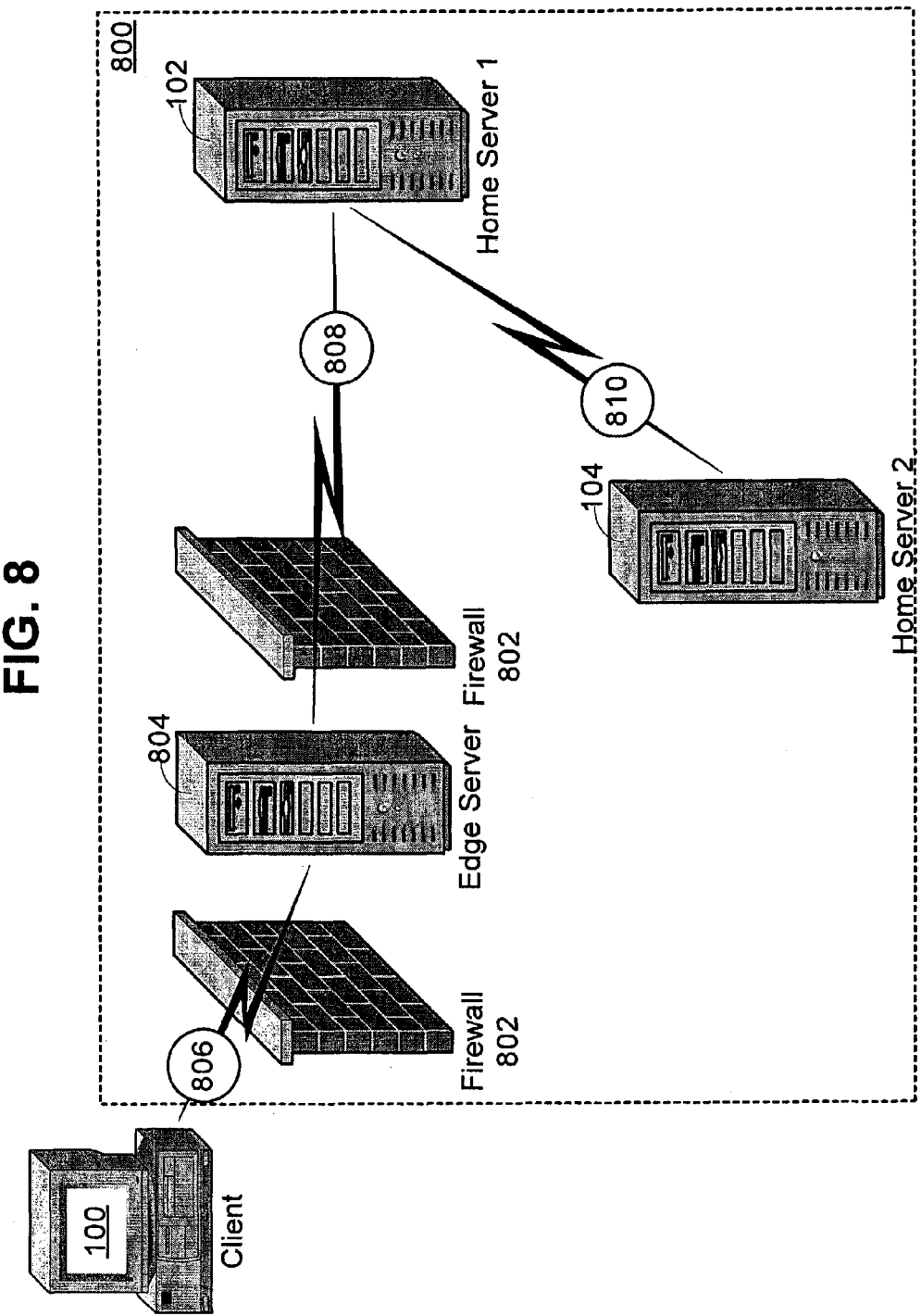
FIG. 8 is a block diagram of a communications environment with a client outside a firewall, with an edge server, and with home servers within the firewall.

In the communications environment of FIG. 8, the home servers 102 and 104 are in a protected corporate network 800 behind corporate firewalls 802. An edge server 804 sits between the firewalls and passes incoming requests through the firewalls 802 to the home servers 102 and 104. These home servers 102 and 104 are not published in the DNS SRV so, when the client 100 asks for a server, the edge server 804 is identified.

Figure 9B:
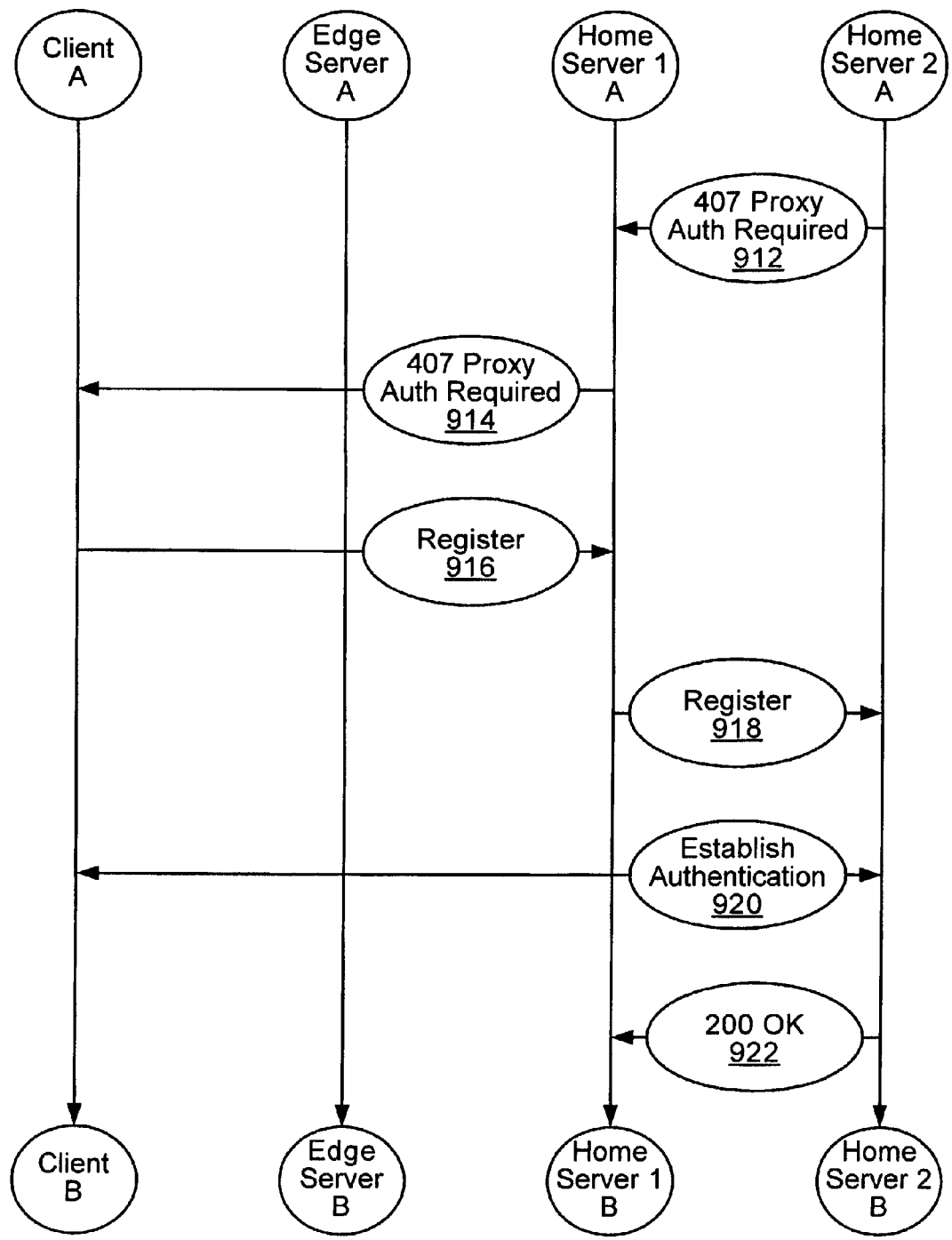

Referring to FIG. 8 and to the dataflow diagram of FIGS. 9a, 9b, and 9c, the client 100 first attempts to register with the edge server 804 (communications flow 806, message 900). In one embodiment, the edge server 804 does not consult the client-to-home-server database 300, but rather immediately passes on the request to a home server selected possibly at random. In FIG. 8, the edge server 804 selects the home server 102 (communications flow 808, message 902). Upon receipt, the home server 102 can apply the method illustrated in the flowchart of FIGS. 5a and 5b. With messages passing through the edge server 804, the client 100 authenticates itself to the home server 102 (messages 904 through 908). In step 504 of FIG. 5a, the home server 102 realizes that the client 100 is assigned to the home server 104. In step 512 of FIG. 5b, the home server 102 notes that the messages it receives from the client 100 have more than one Via header: The client 100 adds the first Via header, and the edge server 804 adds another. Thus, in step 514, the home server 102 begins to proxy the client 100's messages to the home server 104 rather than redirecting the client 100 (communications flow 810, message 910). For the remainder of the conversation between the client 100 and its assigned home server 104, the messages are passed through both the edge server 804 and the proxying home server 102 (messages 912 through 926).

The continuing presence of the home server 102 in the conversation between the client 100 and the home server 104 is an unfortunate consequence of choosing to proxy rather than to redirect. This proxying consumes some of the resources of the home server 102 that could have been dedicated to providing services to clients assigned to the home server 102.

Figure 10:
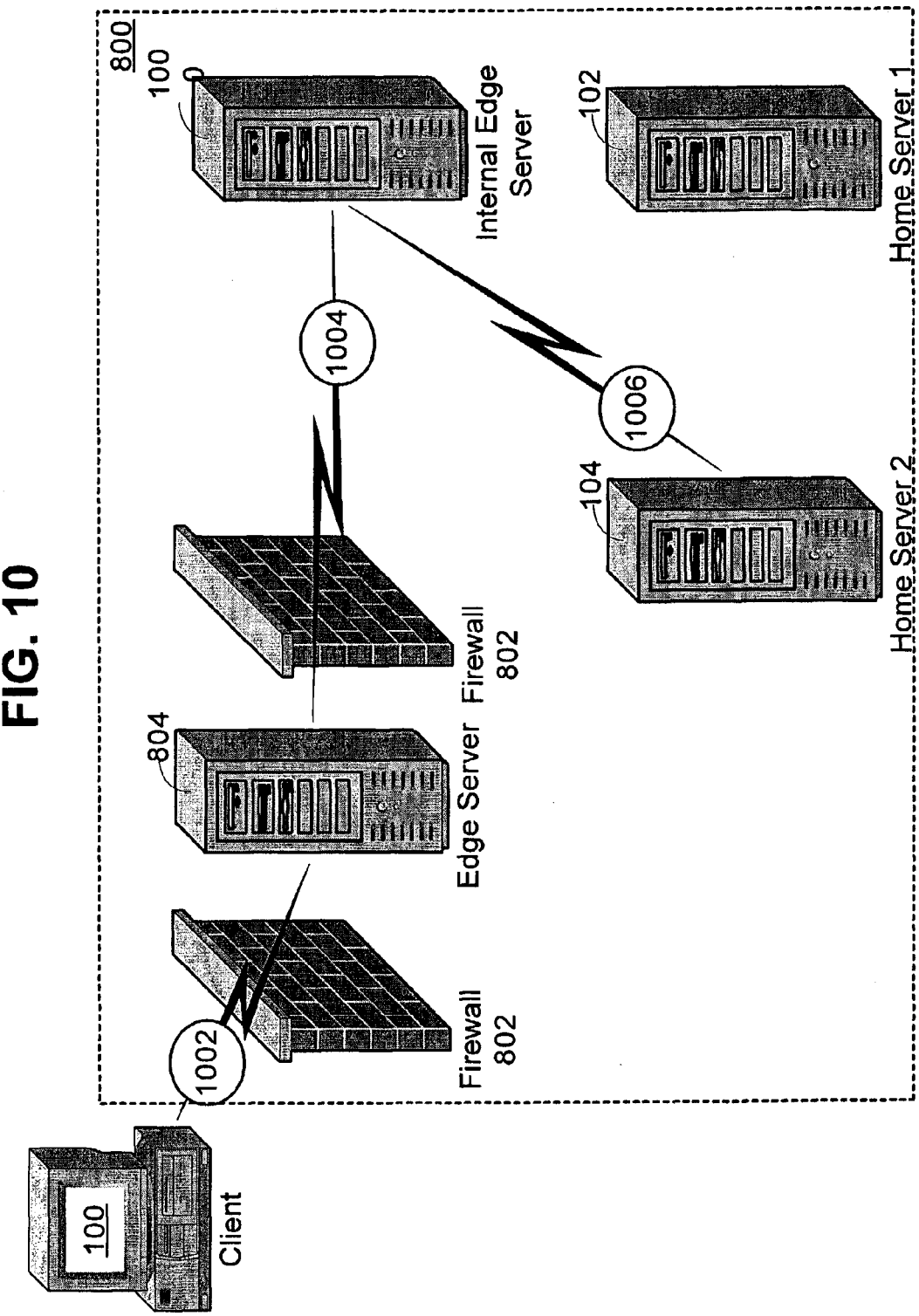
FIG. 10 is a block diagram of a communications environment with a client outside a firewall, with an edge server, and with an internal edge server and home servers within the firewall.

The communications environment of FIG. 10 addresses this problem of proxy overhead overloading home servers. In FIG. 10, an internal edge server 1000 is added within the protected corporate network 800. This internal edge server 1000 can operate just like the load distributing server 600 of FIG. 6 and is never a client's assigned home server.

Figure 11A:
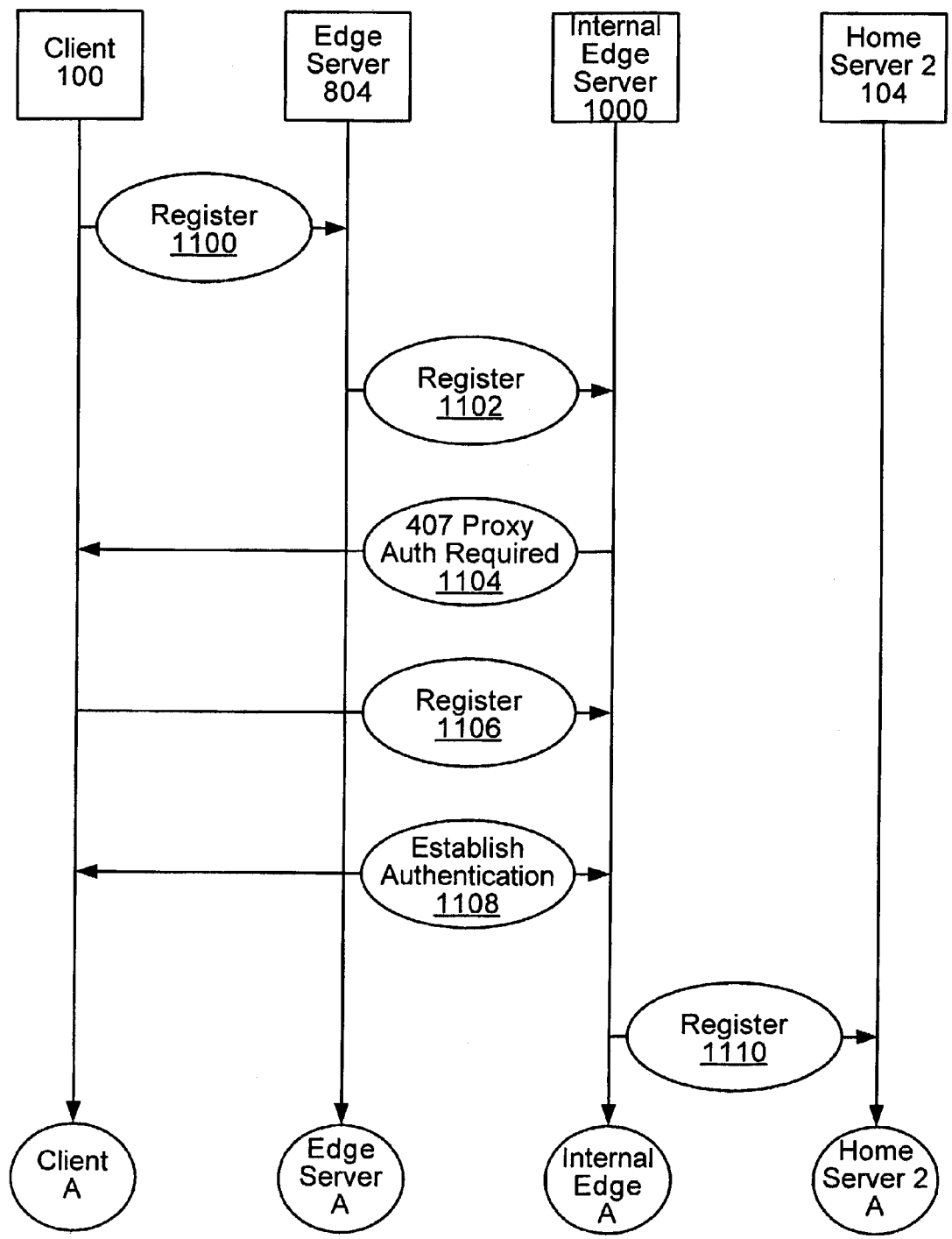
FIGS. 11a, 11b, and 11c together form a dataflow diagram illustrating how an embodiment of the present invention could work in the communications environment of FIG. 10.
Figure 11B:
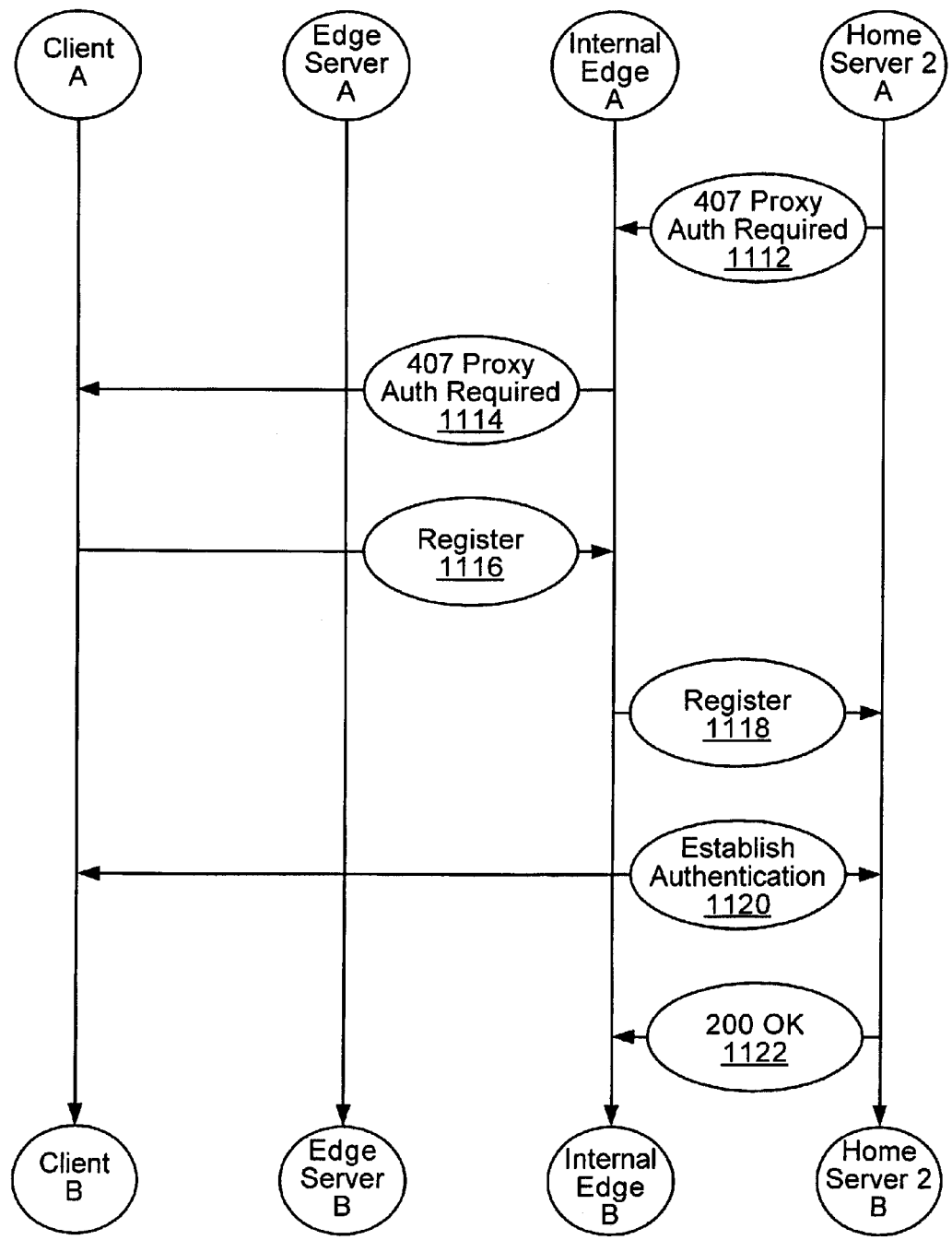
Figure 11C:
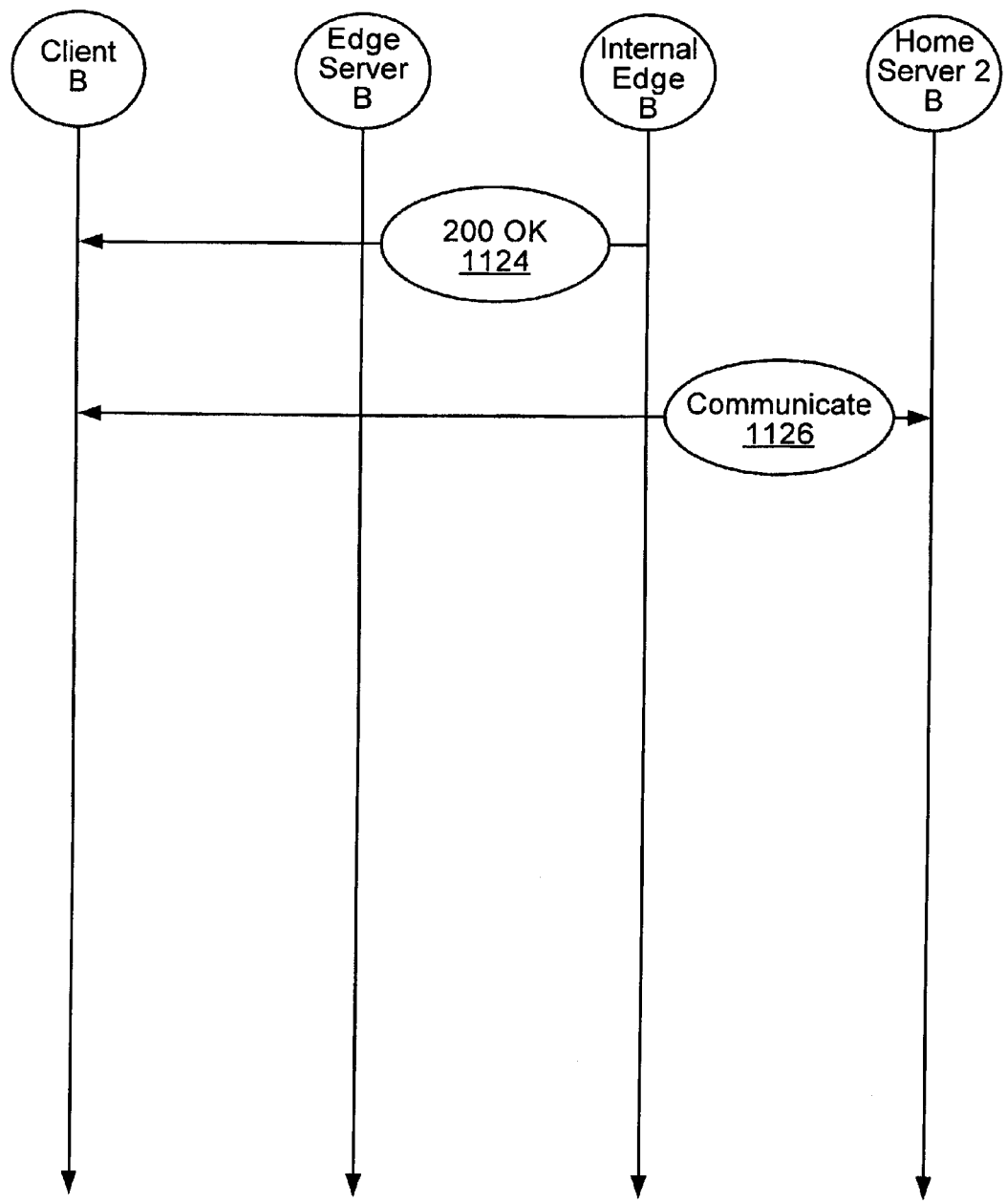

The dataflow diagram of FIGS. 11a, 11b, and 11c, shows how the two edge servers 804 and 1000 of FIG. 10 cooperate in distributing traffic. The client 100 issues a DNS SRV request for a home server, and the edge server 804 is identified, just as in the previous example (communications flow 1002, message 1100). However, unlike in the previous example, this edge server 804 does not choose a home server but instead passes the request on to the internal edge server 1000 (communications flow 1004, message 1102). Just like the load distributing server 600 of FIG. 6, the internal edge server 1000 authenticates the client 100 and determines to which home server the client 100 is assigned (messages 1104 through 1108). Because the number of Via headers in messages received at the internal edge server 1000 is at least two (one from the client 100 and one from the edge server 804), the internal edge server 1000 proxies the conversation between the client 100 and its assigned home server 104 (communications flow 1006 and messages 1110 through 1126).

While the result is superficially the same as in the environment of FIG. 8, there are significant advantages to having the proxying done by the internal edge server 1000 rather than by the home server 102. First, the internal edge server 1000 can be optimized for the task of proxying as it need not provide client services itself. Second, this arrangement removes the overhead from the home server 102 allowing it to more efficiently perform its primary role of providing services. Finally, and in a manner similar to the example of the load distributing server 600 of FIG. 6, only the internal edge server 1000 need have access to the client-to-home-server database 300 and need be aware when that database changes.

Figure 12:
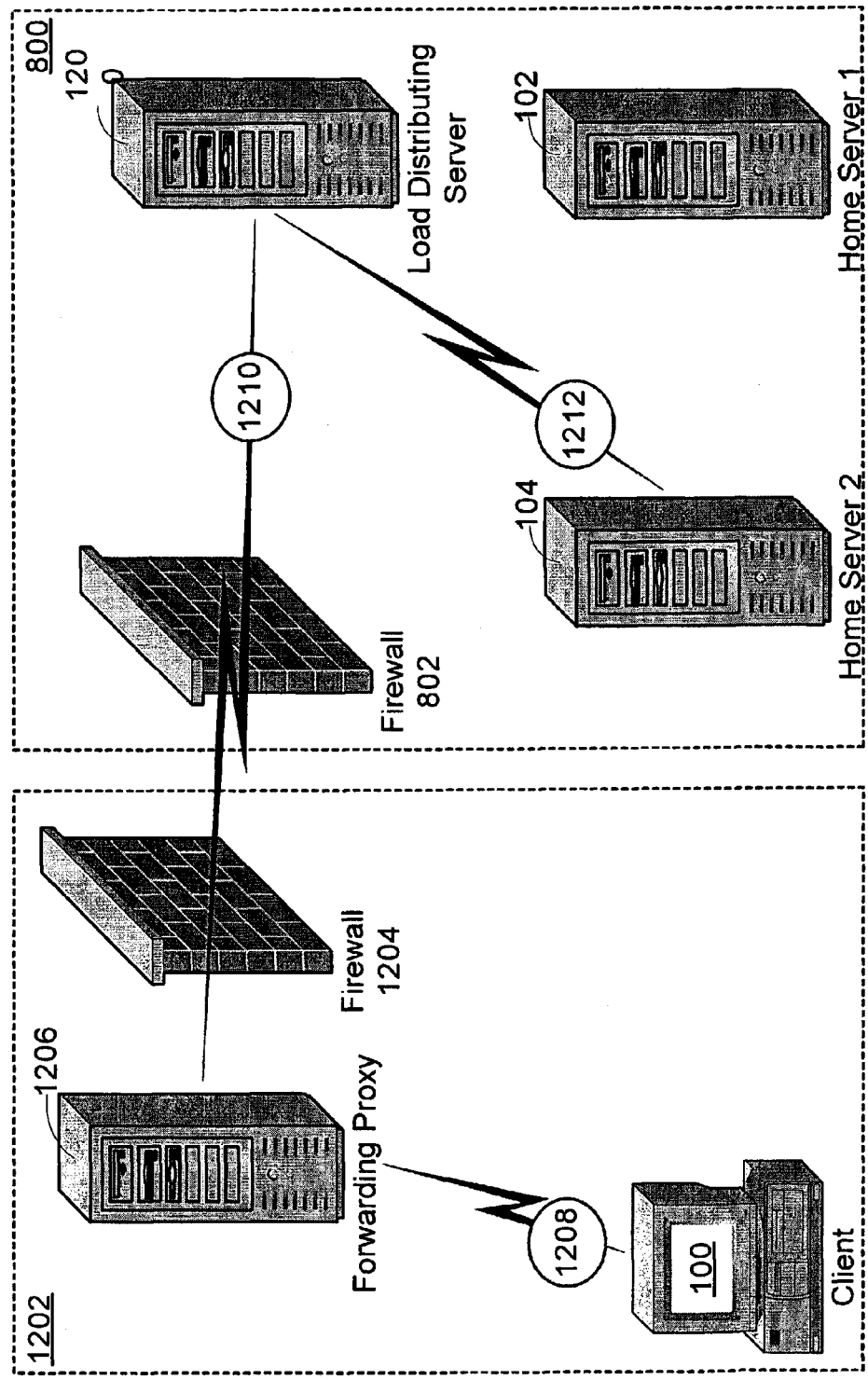
FIG. 12 is a block diagram of a communications environment with a client behind one firewall and with a dedicated load distributing server and home servers behind another firewall.

One final exemplary communications environment is depicted in FIG. 12. The client 100 sits in its own network 1202 protected by a firewall 1204. In order to access servers beyond its firewall 1204, including the home servers 102 and 104, the client 100 communicates through a forward proxying server 1206. The client 100's request goes through the forwarding proxy server 1206 (communications flow 1208), through the local firewall 1204, into the corporate network 800 via the corporate firewall 802, and on to a load distributing server 1200 (communications flow 1210). By the time the client 100's messages reach the load distributing server 1200, they have at least two Via headers, so the load distributing server 1200 proxies the communications between the client 100 and its assigned home server 104, as described above for other scenarios.

The above communications scenarios are merely meant to illustrate various aspects of the present invention. Other topologies can be created by mixing the pieces shown above, any of the various servers can be replicated for reliability purposes, and other messaging and authentication mechanisms can be employed.

Figure 13:
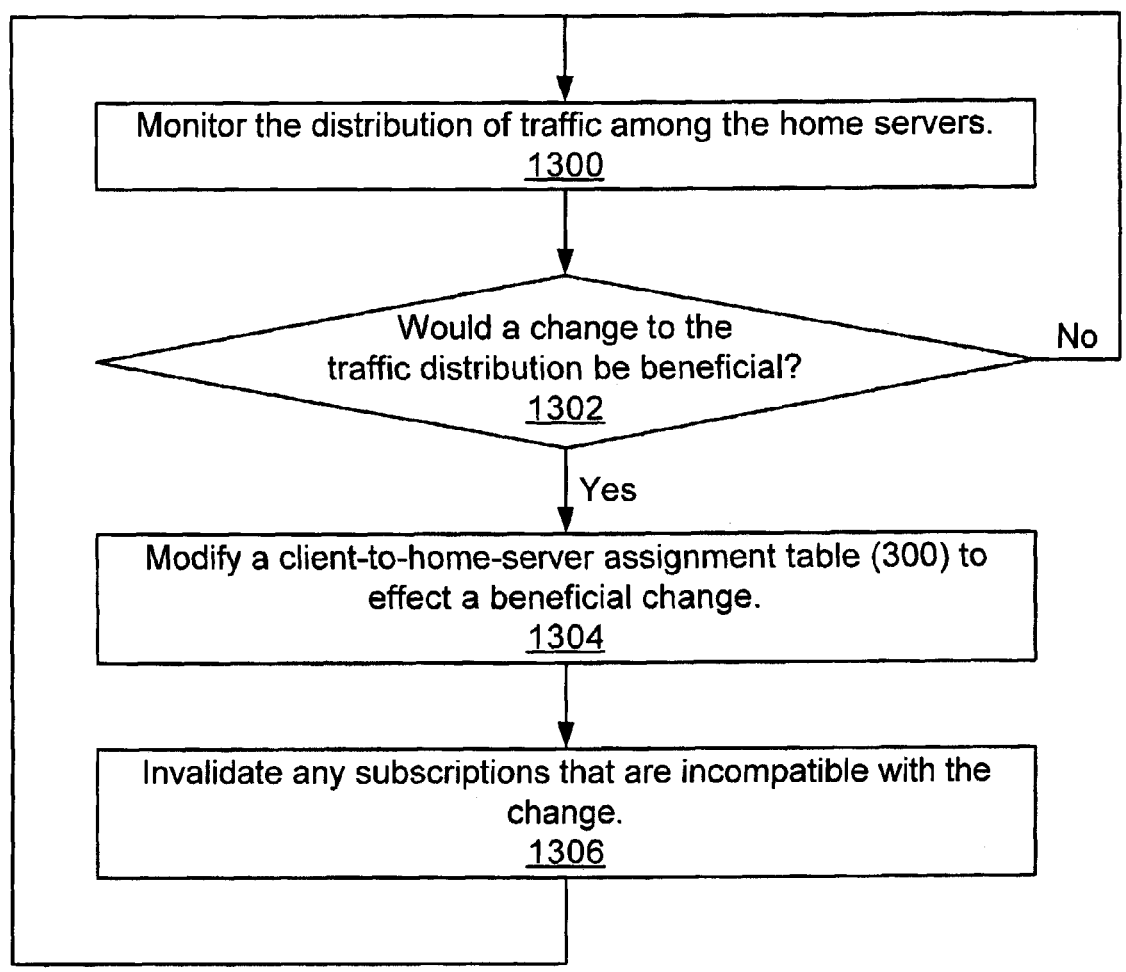
FIG. 13 is a flowchart showing an exemplary method according to the present invention for changing the distribution of traffic among servers.

By centralizing client-to-home-server assignments in the database 300 (which database can itself be distributed), embodiments of the present invention facilitate making alterations in the load distribution when circumstances warrant. The flowchart of FIG. 13 presents an example of how this can be accomplished. In step 1300, the distribution of traffic among the home servers is monitored. Traffic monitoring is a well studied field, and several mechanisms for monitoring, and protocols for reporting the results, are available. In step 1302, a decision is made as to whether the presently reported load distribution is acceptable. Circumstances that may call for a change include: (1) A home server needs to be removed from service for maintenance reasons; (2) A home server unexpectedly crashes; (3) The home servers were overloaded so a new home server is being added and some traffic should be redistributed to it; and (4) The clients assigned to a particular home server require, on average, more support than most clients, thus this home server cannot support as many clients as expected. If a change in traffic distribution would be beneficial, then the client-to-home-server assignment database 300 is modified in step 1304. Mechanisms are well known in the art for publishing the modified database 300, if appropriate.

If any subscriptions have been set up that reflect now changed client-to-home-server assignments, those subscriptions are invalidated in step 1306. Notifications are sent to watchers of the subscriptions of the invalidation. When the subscriptions are subsequently renewed, they are based on the updated information in the database 300.

In any case, once the client-to-home-server database 300 is updated, future queries by home servers retrieve the new traffic distribution information, and that new information is applied to redistribute traffic accordingly.

The above discussion focuses on the operation of the home servers and of related objects (load distributing servers, edge servers, and the like). A few words are in order concerning the operation of the client. If the client receives multiple redirects during the registration process, then something is probably wrong in the client-to-home-server database 300. If the client receives a redirection message from a server to which the client was redirected (i.e., the client detects a redirection loop), then the client ignores the redirection and shows a login failure. If the client receives more than a set number of redirections while registering (e.g., more than five), then the client abandons the login attempt and registers a failure. Finally, if the client receives a redirection while refreshing its registration, then the client treats this as a logout and proceeds through the whole login procedure again.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments depend upon existing messaging protocols and network arrangements. Those protocols and arrangements can be altered or replaced without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. A method performed by servers that each provide a service for clients, the method for distributing a request for service received from a client to a server for servicing the request, the servers being in a network, some of the clients being internal to the network and some of the clients being external to the network, the method comprising:
    providing a client-to-server assignment data structure specifying assignments of each client to one of the servers as a home server for the client;
    receiving by a receiving server a request sent from a requesting client for a service,
        wherein the network includes an edge server through which requests from external clients pass before being provided to the receiving server, and wherein the request sent from a requesting client includes a Via header and the edge server adds another Via header to a request sent from an external client; and
    under control of the receiving server,
        identifying by the receiving server a home server of the requesting client from the client-to-server assignment data structure before providing the requested service;
        determining whether the receiving server is the identified home server;
        after determining that the receiving server is the identified home server, providing by the receiving server the service requested by the requesting client;
        after determining that the receiving server is not the identified home server,
            determining whether the requesting client is internal or external to the network based on number of Via headers of the received request;
            after determining that the requesting client is internal to the network, sending by the receiving server a response to the requesting client indicating that the requesting client should redirect the received request to the identified home server so that the identified home server provides the service requested by the requesting client; and
            after determining that the requesting client is external to the network, proxying by the receiving server the received request from the receiving server to the identified home server so that the identified home server provides the service requested by the requesting client.

2. The method of claim 1 wherein the edge server upon receiving a request for a service from an external client selects a server to receive the request to effect load balancing of receiving requests among the servers.

3. The method of claim 2 wherein the client-to-server assignment data structure provides load balancing among assignments of clients to home servers.

4. The method of claim 1 wherein the network includes a firewall separating the servers and internal clients from the external clients.

5. The method of claim 1 wherein sending by the receiving server a response to the requesting client indicating that the requesting client should redirect the received request to the identified home server comprises sending a 301 Moved Permanently SIP response code.

6. A computer-readable storage medium that is not a signal containing instructions for controlling a server that provides a service for clients to perform a method to distribute a request for service received from a client to another server that also provides the service for clients, the servers being in a network, some of the clients being internal to the network and some of the clients being external to the network, the method comprising:

receiving by a receiving server a request sent from a requesting client for a service; and under control of the receiving server, identifying the home server of the requesting client before providing the requested service;

when the receiving server is the identified home server, providing the service requested by the requesting client;

when the receiving server is not the identified home server, when the requesting client is internal to the network, sending a response to the requesting client indicating that the requesting client should redirect the received request to the identified home server so that the identified home server provides the service requested by the requesting client; and when the requesting client is external to the network, proxying the received request from the receiving server to the identified home server so that the identified home server provides the service requested by the requesting client, wherein the network includes an edge server through which requests from external clients pass before being provided to the receiving server, and wherein the request sent from the requesting client includes a Via header, the edge server adds another Via header to a request sent from an external client, and the receiving server determines whether the requesting client is internal or external to the network based on number of Via headers of the received request.

7. The computer-readable storage medium of claim 6 wherein the edge server upon receiving a request for a service from an external client selects a server to receive the request to effect load balancing of receiving requests among the servers.

8. The computer-readable storage medium of claim 7 wherein a client-to-server assignment data structure specifies assignments of each client to one of the servers as a home server for the client to provide load balancing among assignments of clients to home servers.

9. The computer-readable storage medium of claim 6 wherein the network includes a firewall separating the servers and internal clients from the external clients.

10. A server that receives from a requesting client a request to provide a service and the receiving server either provides the service to the client or distributes the received request to another server that also provides the service for clients, the servers being in a network, some of the clients being internal to the network and some of the clients being external to the network, comprising:

a memory storing computer-executable instructions of:

a component that identifies a home server of the requesting client before providing the requested service;

a component that, when the receiving server is the identified home server, provides the service requested by the requesting client;

a component that, when the receiving server is not the identified home server, determines whether the requesting client is internal or external to the network;

when it is determined that the requesting client is internal to the network, sends a response to the requesting client indicating that the requesting client should redirect the received request to the identified home server; and when it is determined that the requesting client is external to the network, proxies the received request from the receiving server to the identified home server; and a processor that executes the computer-executable instructions stored in the memory, wherein the network includes an edge server through which requests from external clients pass before being provided to a receiving server, and wherein the request sent from the requesting client includes a Via header, the edge server adds another Via header to a request sent from an external client, and the receiving server determines whether the requesting client is internal or external to the network based on number of Via headers of the received request.

11. The server of claim 10 wherein the edge server selects a server to receive the each request it receives from an external client to effect load balancing of receiving requests among the servers.

12. The server of claim 11 wherein an internal client selects a server to receive the request to effect load balancing of receiving requests among the servers.

13. The server of claim 10 wherein a client-to-server assignment data structure specifies assignments of each client to one of the servers as a home server for the client to provide load balancing among assignments of clients to home servers.

14. The server of claim 10 wherein the network includes a firewall separating the servers and internal clients from the external clients.

* * * * *